Oct. 25, 1960 V. RE 2,957,329
CONTROL CIRCUITS FOR AUTOMATIC CLOTHES WASHING MACHINES
Filed May 25, 1959 3 Sheets-Sheet 1
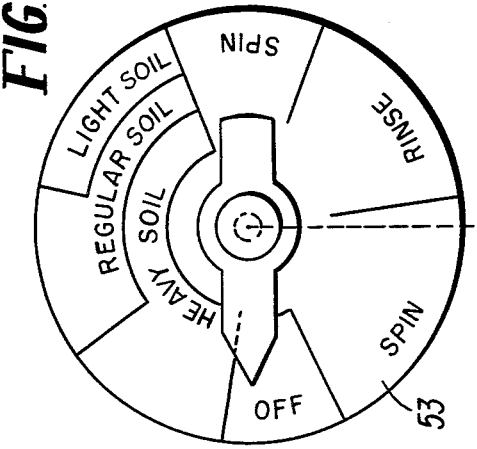
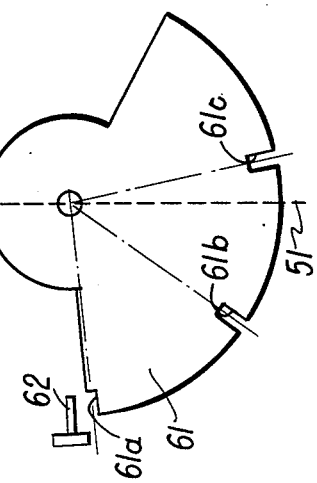
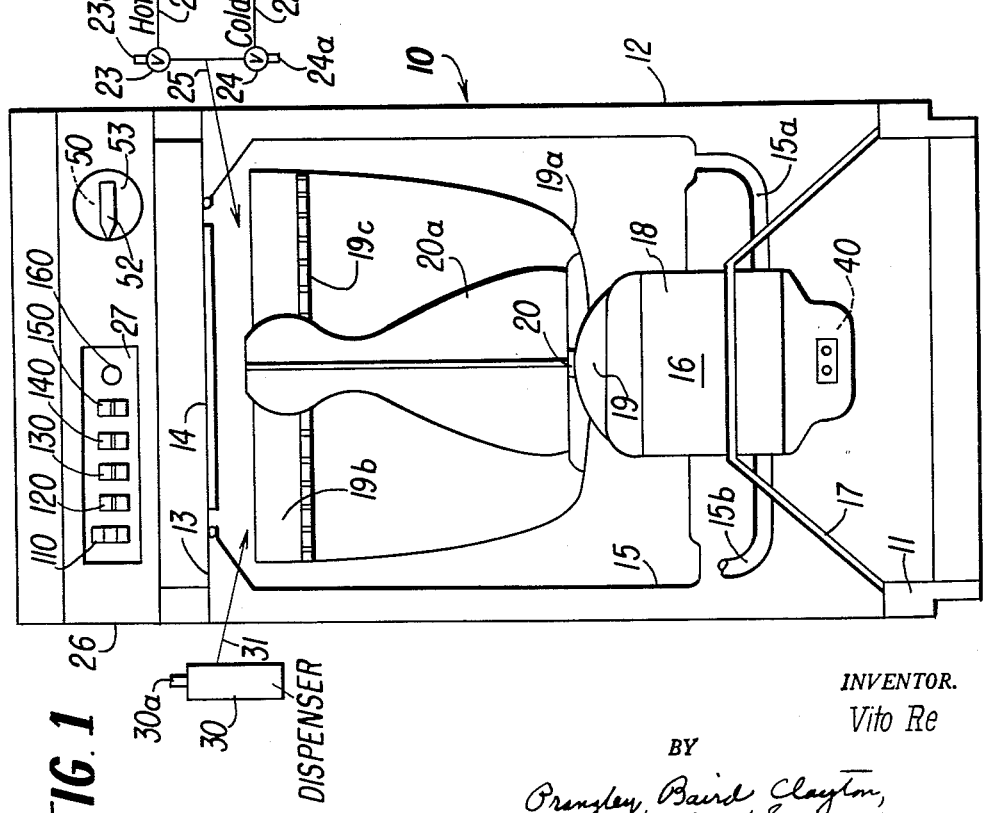
INVENTOR.
Vito Re
BY
Prangley, Baird, Clayton,
Miller & Vogel
Attys.

INVENTOR.
Vito Re

Oct. 25, 1960 V. RE 2,957,329
CONTROL CIRCUITS FOR AUTOMATIC CLOTHES WASHING MACHINES
Filed May 25, 1959 3 Sheets-Sheet 3

| CAMS | SWITCH SPRINGS | FUNCTIONS | LONG WASH / REGULAR WASH / SHORT WASH / SPIN / POWER RINSE / SPIN / OFF |
|---|---|---|---|
| C1 | 71/72 | FILL HOT SOL. | |
| | 71/73 | RINSE HOT SOL. | |
| C2 | 74/75 | FILL COLD SOL. | |
| | 74/76 | RINSE COLD SOL. | |
| C3 | 77/78 | WATER LEVEL | |
| | 77/79 | POWER RINSE | |
| C4 | 81/82 | DISPENSER SOL. | |
| | 81/83 | MOTOR START | |
| C5 | 84/85 | WASH ROTATION | |
| | 84/86 | SPIN ROTATION | |
| C6 | 87/88 | SPIN ROTATION | |
| | 87/89 | WASH ROTATION | |
| C7 | 91/92 | SPIN POWER | |
| | 91/93 | WASH POWER | |
| C8 | 94/95 | TIMER MOTOR | |

TIME INTERVALS 45 SECONDS EACH — 6° BETWEEN ADJACENT POSITIONS

FIG. 4

INVENTOR.
Vito Re
BY
Prangley, Baird, Clayton
Miller & Vogel,
Attys.

United States Patent Office 2,957,329
Patented Oct. 25, 1960

2,957,329

CONTROL CIRCUITS FOR AUTOMATIC CLOTHES WASHING MACHINES

Vito Re, Cicero, Ill., assignor to General Electric Company, a corporation of New York Filed May 25, 1959, Ser. No. 815,417

16 Claims. (Cl. 68—12)

The present invention relates to control circuits for automatic clothes washing machines, and more particularly to improved control circuits of the general character disclosed in U.S. Patent No. 2,841,003, granted on July 1, 1958 to George D. Conlee.

It is the general object of the present invention to provide in a clothes washing machine of the automatic type, an electric drive motor of the 2-speed reversible rotor type, and an improved control circuit for the motor, whereby forward rotation of the rotor at its respective high and low speeds effect respective normal and gentle washing actions in the automatic cycle of the machine and reverse rotation of the rotor at its respective high and low speeds effect respective normal and gentle water-extracting actions in the automatic cycle of the machine.

Another object of the invention is to provide in an automatic clothes washing machine of the character noted, an improved arrangement of the control circuit, wherein the directions of rotation of the rotor are selectively established by a cyclically operable program controller incorporated in the control circuit and the speeds of rotation of the rotor in its two directions are selectively preset by manually operable switches incorporated in the control circuit, whereby the operator may preselect the respective washing and water-extracting actions in the automatic cycle of the machine by effecting corresponding selective operations of the switches prior to initiating cyclic operation of the program controller.

Another object of the invention is to provide in an automatic clothes washing machine, an improved control circuit incorporating a manually operable invention for preselecting the volume of the wash water that is desired in the tube of the machine during the washing action in the automatic cycle thereof, wherein the selective operations of the switch govern the filling of the tub during corresponding time intervals of operation of the cyclically operable program controller incorporated in the control circuit of the machine.

A further object of the invention is to provide an automatic clothes washing machine, an improved control circuit incorporating a cyclically operable program controller that is manually settable from an off position into any one of a plurality of start-fill positions and that is then timer operated from the manually selected start-fill position into a stop-wash position, wherein the tub of the machine is filled with water for the washing action during a fixed time interval regardless of the one of the start-fill positions that is manually selected, and wherein the washing action of the machine proceeds for a time interval that is variable and dependent entirely upon the one of the start-fill positions thereof that is initially manually selected.

Yet another object of the invention is to provide in an automatic clothes washing machine, a control circuit of the character noted that incorporates an arrangement for preventing cyclic operation of the program controller unless it is properly manually preset into one of the start-fill positions thereof.

A still further object of the invention is to provide in an automatic clothes washing machine, a control circuit of improved connection and arrangement that is economical to manufacture and that is entirely reliable in operation.

Further features of the invention pertain to the particular arrangement of the elements of the electric control circuit for the clothes washing machine, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1 is a combined schematic illustration and skeleton front view of an automatic clothes washing machine incorporating an electric control circuit embodying the present invention;

Fig. 2 is a combined schematic illustration and plan view of a part of the program controller that is incorporated in the electric control circuit of the machine shown in Fig. 1;

Fig. 4 is a time-sequence control chart of the control cams included in the program controller incorporated in the electric control circuit shown in Fig. 3.

Figure 3:
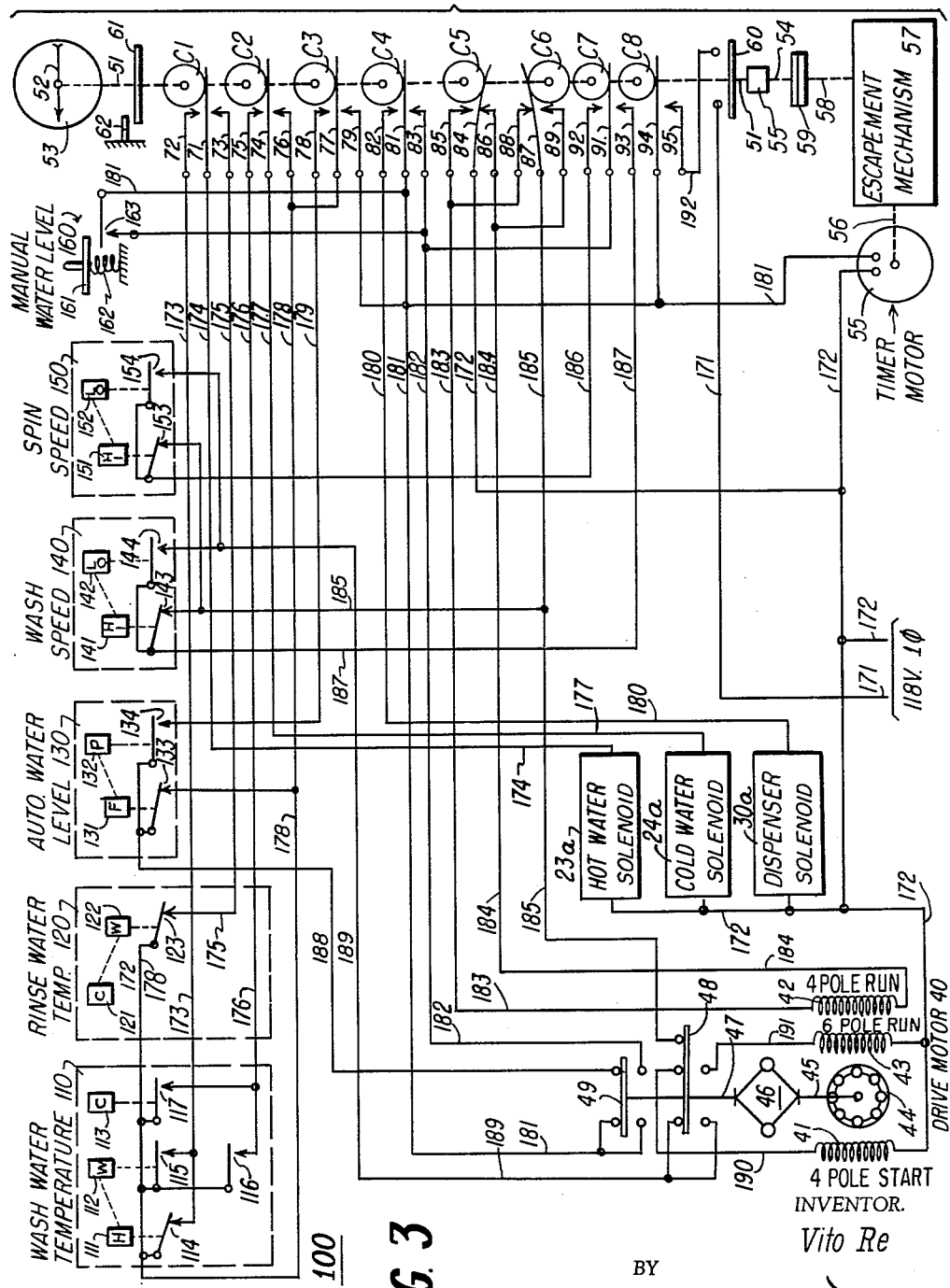
Fig. 3 is a diagram of the electric control circuit embodying the present invention and incorporated in the machine shown in Fig. 1.

Referring now to Fig. 1 of the drawings, the clothes washing machine 10 there illustrated is of the spin-tub type and of the general construction and arrangement of that disclosed in U.S. Patent No. 2,639,618, granted on May 26, 1953, to Jacob W. McNairy. More particularly, the machine 10 comprises a substantially square supporting base 11 carrying wall structure defining an upstanding casing 12 including a substantially horizontally disposed top wall 13 having a top opening therein provided with a cooperating top door 14 arranged for movements between open and closed positions with respect thereto. Housed within the casing 12 is an upstanding drain tub 15 that is suitably supported upon the base 11 and provided with an open top that is sealed against the underside of the top wall 13 in surrounding relation with respect to the top opening therein. A unitary mechanism 16 is arranged in upstanding position in the lower portion of the casing 12 and suitably supported upon the base 11 by structure indicated at 17. The mechanism 16 includes a casing 18 that is arranged in an opening provided in the bottom wall of the drain tub 15 and sealed in place, whereby the lower portion of the casing 18 is disposed below the bottom wall of the drain tub 15 and the upper portion of the casing 18 is disposed above the bottom wall of the drain tub 15. The casing 18 houses in the lower portion thereof an electric drive motor 40 of the two-speed reversible-rotor type that is also of the 4-pole, 6-pole, split-phase induction type, as described more fully hereinafter; the rotor of which drive motor 40 is operatively connected to a water pump, not shown, that is also housed within the casing 18. In the arrangement, the pump mentioned is provided with an inlet to which there is connected an inlet conduit 15a communicating with the bottom of the drain tub 15, and also an outlet to which there is connected an outlet conduit 15b extending to drain plumbing not shown. In the arrangement, rotation of the rotor of the drive motor 40 in at least the reverse direction thereof operates the pump mentioned, so that any water in the drain tub 15 is pumped therefrom to the drain plumbing via the conduits 15a and 15b in an obvious manner.

Also the unitary mechanism 16 comprises an outer rotatable element 19 arranged adjacent to the upper end of the casing 18 and disposed exteriorly thereof and positioned in the lower portion of the drain tub 15; which rotatable element 19 carries an upstanding spin tub 19a that is of conventional construction provided with a substantially annular wall that is upwardly and outwardly flared and having an open top disposed somewhat below the top opening provided in the top wall 13 and in alignment therewith, thereby to accommodate ready placement and removal of the clothes with respect to the spin tub 19a through the top opening mentioned, when the top door 14 occupies its open position. Further, the unitary mechanism 16 comprises an inner oscillatable element 20 projecting through the extreme upper end of the rotatable element 19 and carrying an upstanding agitator 20a arranged substantially centrally within the spin tub 19a. Moreover, the upper open end of the spin tub 19a carries the usual balance ring 19b through which suitable annular openings 19c are arranged for the centrifugal discharge of the water therethrough from the spin tub 19a into the drain tub 15.

Finally, the unitary mechanism 16 comprises operative mechanism for selectively interconnecting the rotor of the electric drive motor 40 respectively to the agitator 20a and to the spin tub 19a. In the arrangement, when the rotor of the drive motor 40 is rotated in the forward direction, the agitator 20a is oscillated thereby, and when the rotor of the drive motor 40 is rotated in the reverse direction, the spin tub 19a is rotated thereby. Of course, oscillation of the agitator 20a effects a washing action upon the clothes suspended in the wash water contained in the spin tub 19a, while rotation of the spin tub 19a effects a water-extraction action upon the clothes contained in the spin tube 19a. Specifically, rotation of the spin tub 19a causes the wash water contained therein to be flung therefrom by centrifugal force and then causes water absorbed by the clothes to be extracted therefrom by centrifugal action and flung from the spin tub 19a. The water flung from the spin tub 19a is caught by the drain tub 15, whereby it is pumped to the drain plumbing, not shown, by the operating pump previously mentioned that is housed within the casing 18 of the unitary mechanism 16. In the arrangement, the operative mechanism housed in the casing 18 is selectively responsive to the direction of rotation of the rotor of the electric drive motor 40 in order to select one or the other of the two corresponding actions of the machine 10 in an obvious manner, whereby washing and water-extracting actions may be selectively effected upon the clothes contained in the spin tub 19a by selectively controlling the electric drive motor 40 in order to cause rotation of the rotor thereof in the respective forward and reverse directions as required, and as explained more fully hereinafter.

Further, the machine 10 comprises a water supply system indicated schematically as including a hot water supply pipe 21 and a cold water supply pipe 22, as well as a delivery tube 25 directly communicating with the open top of the spin tub 19a. In the arrangement a valve 23 is arranged in the hot water supply pipe 21 and a valve 24 is arranged in the cold water supply pipe 22. The valve 23 is of the solenoid-operated type, the solenoid of which is indicated at 23a; and similarly, the valve 24 is of the solenoid-operative type, the solenoid of which is indicated at 24a. Moreover, the valves 23 and 24 are biased into their closed positions. When the solenoid 23a is energized, the valve 23 is operated into its open position so that hot water is supplied from the hot water supply pipe 21 via the tube 25 into the spin tub 19a; and when the solenoid 24a is energized, the valve 24 is operated into its open position so that cold water is supplied from the cold water supply pipe 22 via the tube 25 into the spin tub 19a. Of course, it will be understood that the conjoint operations of the valves 23 and 24 into their open positions bring about the supply of warm water via the tube 25 into the spin tub 19a, as a consequence of the mixing of the hot water from the hot water supply pipe 21 and the cold water from the cold water supply pipe 22.

Further, the machine 10 comprises a dispenser 30 of the solenoid-operating type, the solenoid of which is indicated at 30a; which dispenser 30 is provided with a delivery tube 31 that directly communicates with the open top of the spin tub 19a. The dispenser 30 is adapted to contain a suitable liquid clothes-conditioning agent and is operative in responsive to energization of the solenoid 30a to effect the delivery of a measured charge of the liquid clothes-conditioning agent therefrom via the delivery tube 31 into the spin tub 19a. The liquid clothes-conditioning agent contained in the dispenser 30 may be of a conventional type effecting one or more of the usual whitening, bleaching, softening, etc., functions upon the clothes contained in the spin tub 19a.

In the machine 10, the water supply system, including the valves 23 and 24, as well as the dispenser 30, are suitably housed in the casing 12; and preferably the dispenser 30 is provided with a fill conduit, not shown, that is accessible through the top opening provided in the top wall 13 when the top door 14 occupies its open position, so as to accommodate the ready filling thereof with the liquid clothes-conditioning agent mentioned. Of course, it will be understood that in Fig. 1, the showings of the water supply system and the dispenser 30 are entirely diagrammatic and that actually these components of the machine 10 are housed within the casing 12, as previously noted.

The rear portion of the top wall 13 carries an upstanding backsplash 26 that, in turn, carries manually settable control equipment that is incorporated in the control circuit of the machine 10. Specifically, the left-hand side of the backsplash 26 carries a panel 27 behind which there mounted: a wash water temperature control switch 110, a rinse water temperature control switch 120, an automatic water level control switch 130, a wash speed control switch 140, a spin speed control switch 150 and a manual water level control switch 160; which switches are of the pushbutton type and readily accessible from the front of the machine 10. The right-hand side of the backsplash 26 carries a program controller 50 that includes a rotatably mounted operating shaft 51 projecting forwardly through a cooperating hole provided in the front wall of the backsplash 26 and carrying on the extreme front end thereof a manually operable knob and index pointer 52 that cooperates with an associated stationary disk-like index plate 53 mounted upon the front wall of the backsplash 26.

As best shown in Fig. 3, the wash water temperature control switch 110 is of the manually operable pushbutton type, including three individual pushbuttons 111, 112 and 113 that are suitably interlocked so that only one of these pushputtons may be operated at any time and so that the operation or depression of any one of these pushbuttons effects the restoration or projection of the last previously operated one of these pushbuttons. Similarly, the rinse water temperature control switch 120 is of the manually operable pushbutton type, including two individual pushbuttons 121 and 122 that are suitably interlocked in the manner previously explained. Similarly, the automatic water level control switch 130 is of the manually operable pushbutton type, including two individual pushbuttons 131 and 132 that are suitably interlocked in the manner previously explained. Similarly, the wash speed control switch 140 is of the manually operable pushbutton type, including two individual pushbuttons 141 and 142 that are suitably interlocked in the manner previously explained. Similarly, the spin speed control switch 150 is of the manually operable pushbutton type, including two individual pushbuttons 151 and 152 that are suitably interlocked in the manner previously explained. Preferably, the pushbutton switches 110, 120, 130, 140 and 150 are of the construction and arrangement of that disclosed in U.S. Patent No. 2,431,904, granted December 2, 1947 to John L. Andrews. Thus it will be understood that in any one of these pushbutton switches 110, etc., when any one of the individual pushbuttons 111, etc., is manually operated, it remains in its operated or depressed position until another one of these individual pushputtons 112, etc., is subsequently operated into its depressed position, so as to restore into its projected position, the previously last operated one of these individual pushbuttons 111, etc. Moreover, each of these pushbutton switches is preferably provided with a color control illuminating arrangement of the character of that disclosed in U.S. Patent No. 2,437,555, granted on March 9, 1948 to Gregory L. Rees. However, in the interest of simplification, the color illuminating system that is normally incorporated in each of these pushbutton switches 110, etc., has been omitted from the circuit drawing of Fig. 3. Preferably, the manual water level control switch 160 is of the simple pushbutton type, including a single pushbutton 161 that is normally biased by an associated compression spring 162 into its normal or projected position; whereby the pushbutton 161 may be manually actuated against the bias of the compression spring 162 into its operated or depressed position.

In the control switch 110, the individual pushbuttons 111, 112 and 113 respectively comprise hot and warm and cold bushbuttons; the hot pushbutton 111 controls an associated pair of contacts 114; the warm pushbutton 112 controls two associated pairs of contacts 115 and 116; and the cold pushbutton 113 controls an associated pair of contacts 117. In the control switch 120, the individual pushbuttons 121 and 122 respectively comprise cold and warm pushbuttons; and the warm pushbutton 122 controls an associated pair of contacts 123. In the control switch 130, the individual pushbuttons 131 and 132 respectively comprise completely-full and partially-full pushbuttons; the completely-full pushbutton 131 controls an associated pair of contacts 133; and the partially-full pushbutton 132 controls an associated pair of contacts 134. In the control switch 140, the individual pushbuttons 141 and 142 respectively comprise high-speed and low-speed pushbuttons; the high-speed pushbutton 141 controls an associated pair of contacts 143; and the low-speed pushbutton 142 controls an associated pair of contacts 144. In the control switch 150, the individual pushbuttons 151 and 152 respectively comprise high-speed and low-speed pushbuttons; the high-speed pushbutton 151 controls an associated pair of contacts 153; and the low-speed pushbutton 152 controls an associated pair of contacts 154. In the control switch 160, the single pushbutton 161 is only momentarily manually operable and controls an associated pair of contacts 163.

As shown in Fig. 3, the program controller 50 further comprises a plurality of insulating cams C1 to C8, inclusive, that are rigidly secured to the operating shaft 51. The cam C1 controls a switch spring 71 having a normal position disengaging cooperating front and back switch springs 72 and 73, a front position engaging the front switch spring 72 and a back position engaging the back switch spring 73. The cam C2 controls a switch spring 74 having a normal position disengaging cooperating front and back switch springs 75 and 76, a front position engaging the front switch spring 75 and a back position engaging the back switch spring 76. The cam C3 controls a switch spring 77 having a normal position disengaging cooperating front and back switch springs 78 and 79, a front position engaging the front switch spring 78 and a back position engaging the back switch spring 79. The cam C4 controls a switch spring 81 having a normal position disengaging cooperating front and back switch springs 82 and 83, a front position engaging the front switch spring 82 and a back position engaging the back switch spring 83. The cam C5 controls a switch spring 84 having a front position engaging a cooperating front switch spring 85 and a back position engaging a cooperating back switch spring 86. The cam C6 controls a switch spring 87 having a front position engaging a cooperating front switch spring 88 and a back position engaging a cooperating back switch spring 89. The cam C7 controls a switch spring 91 having a normal position disengaging cooperating front and back switch springs 92 and 93, a front position engaging the front switch spring 92 and a back position engaging the back switch spring 93. The cam C8 controls a switch spring 94 having a normal position disengaging a cooperating switch spring 95 and an operated position engaging the switch spring 95.

Also, the operating shaft 51 is mounted for longitudinal axial movement, as well as for the rotary movement previously described; whereby the operating shaft 51 carries a contact bridging member 60 that is adapted selectively to bridge and unbridge an associated pair of contacts and constituting a line switch that is employed for a purpose more fully explained hereinafter. More particularly, when the manually operable pointer 52 is depressed, the operating shaft 51 is moved inwardly with respect to the backsplash 26, so as to move the contact bridging member 60 into its open position with respect to its associated contacts; conversely when the manually operable pointer 52 is withdrawn, the operating shaft 51 is moved outwardly with respect to the backsplash 26, so as to move the contact bridging member 60 into its closed position with respect to its associated contacts.

Also, the program controller 50 comprises a shaft 52 that is mounted only for rotary movement; and one end of the shaft 54 is connected to the adjacent end of the operating shaft 51 by an associated sleeve-type connector 55 that accommodates the relative longitudinal axial sliding movement of the operating shaft 51 with respect to the shaft 54, while maintaining the normal rotary connection between the shaft 54 and the operating shaft 51. Further, the program controller 50 comprises a timer motor 55 that may be of the "Telechron" type and that is provided with an operating shaft 56 connected to a conventional escapement mechanism 57 having a driven shaft 58 that is connected by a friction clutch 59 to the adjacent end of the rotatably mounted shaft 54. In the arrangement, the friction clutch 59 includes two cooperating friction plates that are respectively connected to the adjacent ends of the shafts 54 and 58, thereby to accommodate rotation of the shaft 54, with the operating shaft 51, under the manual control of the index pointer 52, without interference with the normal operation of the escapement mechanism 57. In the program controller 50, continuous operation of the timer motor 55 effects intermittent operation of the escapement mechanism 57; whereby at the expiration of each time interval of 45 seconds, the driven shaft 58 is operated one step of 6°, thereby imparting a corresponding step of rotation through the friction clutch 59 to the shaft 54 and consequently to the operating shaft 51 and the index pointer 52 carried thereby.

More particularly, as explained more fully hereinafter, in the operation of the machine 10, the operator first manually rotates the index pointer 52 in the clockwise direction from its off position into one of its "start-fill" positions, as indicated by the cooperation between the index pointer 52 and the index plate 53; and then the operator actuates the index pointer 52 outwardly; whereby the operating shaft 51 is thus actuated so as to effect operation of the line switch (the contact bridging member 60) into its closed position, with the result that operation of the timer motor 55 is initiated. The operation of the timer motor 55 effects operation of the escapement mechanism 57; whereby the driven shaft 58 is stepped one step of 6° at the expiration of each time interval of 45 seconds. This stepping of the driven shaft 58 is also in the clockwise direction; whereby the shaft 54 is rotated step-by-step in the clockwise direction through the friction clutch 59, driving the operating shaft 51 step-by-step in the clockwise direction through the slide connector 55, with the result that the index pointer 52 is driven step-by-step further in the clockwise direction and ultimately back into its "off" position. When the index pointer 52 is returned back into its "off" position, operation of the timer motor 55 is arrested, so as to arrest operation of the escapement mechanism 57; and at this time, the operator normally depresses the index pointer 52 returning the line switch (the contact bridging member 60) into its normal open position. Of course, during this cycle of operation of the program controller 50, from its selected "start-fill" position back into its "off" position, it effects a predetermined automatic cycle of operation of the machine 10, as explained more fully hereinafter.

Considering now in greater detail the construction and arrangement of the program controller 50, and referring more particularly to Fig. 2, it will be observed that the index plate 53 that cooperates with the index pointer 52 is provided with circumferentially arranged indicia including an "off" segment, a following "heavy soil" segment, a following "regular soil" segment, a follow "light soil" segment, a following "spin" segment, a following "rinse" segment and an ultimate "spin" segment contiguous to the "off" segment, the segments mentioned being disposed in the order named and reading in the clockwise direction. Also, a segmental plate 61 is rigidly secured to the rotatable operating shaft 51 and disposed adjacent to an exteriorly arranged stop member 62; which stop member 62 is adapted selectively to cooperate with three notches 61a, 61b and 61c disposed in circumferentially spaced-apart relation in the segmental plate 61. More particularly, the very beginning of the "heavy soil" segment of the index plate 53 constitutes a first "start-fill" position of the program controller 50; and when the index pointer 52 is rotated out of its "off" position into this very beginning of the "heavy soil" segment of the index plate 53, the segmental plate 61 is rotated to bring the notch 61a into alignment with the stop 62. Similarly, the very beginning of the "regular soil" segment of the index plate 53 constitutes a second "start-fill" position of the program controller 50; and when the index pointer 52 is rotated out of its "off" position into this very beginning of the "regular soil" segment of the index plate 53, the segmental plate 61 is rotated to bring the notch 61b into alignment with the stop 62. Similarly, the very beginning of the "light soil" segment of the index plate 53 constitutes a third "start-fill" of the program controller 50; and when the index pointer 52 is rotated out of its "off" position into this very beginning of the "light soil" segment of the index plate 53, the segmental plate 61 is rotated to bring the notch 61c into alignment with the stop 62.

As indicated in Fig. 3, when the index pointer 52 occupies its normal depressed position operating the line switch 60 into its open position, the segmental plate 61 is disposed immediately below the stop 62; and when the index pointer 52 occupies its operated or projected position operating the line switch 60 into its closed position, the segmental plate 61 is disposed immediately above the stop 62. Accordingly, it will be understood that the index pointer 52 may not be operated from its depressed position into its projected position so as to operate the line switch 60 from its open position into its closed position, unless the index pointer 52 is first operated in the rotary direction to the very beginning of one of the "start-fill" positions, so as correspondingly to align one of the notches 61a, 61b or 61c with the stop 62. In other words, in the event the index pointer 52 is rotated into an intermediate position with respect to the three "start-fill" positions mentioned, a solid portion of the segmental plate 61 will be disposed below the stop 62 and thus in interfering relation with respect to the movement of the operating shaft 51 axially, thereby preventing axial movement of the operating shaft 51 by the index pointer 52 for the purpose of closing the line switch 60. However, of course, when the index pointer 52 has been moved into one of the three "start-fill" positions mentioned, one of the notches 61a, etc., in the segmental plate 61 being aligned with respect to the stop 62, accommodates the passage of the stop 62 therethrough, when the shaft 51 is moved axially by the index pointer 52 for the purpose of closing the line switch 60. This arrangement positively insures that the initial timing operation of the program controller 50, following the manual selection of one of the three "start-fill" positions mentioned proceeds precisely from the selected "start-fill" position and not from some intermediate position with respect to adjacent ones of the "start-fill" position.

Again referring to Fig. 3, it will be observed that the drive motor 40 is of the 4-pole-6-pole, split-phase, induction type, including a reversible motor 44 and a cooperating frame carrying a 4-pole run winding 42, a 6-pole run winding 43 and a 4-pole start winding 41. When the 4-pole run winding 42 is energized with forward polarity, the rotor 44 runs in the forward direction at its high speed of approximately 1725 r.p.m. effecting fast oscillation of the agitator 20a at a rate of approximately 64 cycles per minute that is suitable for washing regular fabrics; and when the 6-pole run winding 43 is energized with forward polarity, the rotor 44 runs in the forward direction at its low speed of approximately 1140 r.p.m. effecting slow oscillation of the agitator 20a at a rate of approximately 45 cycles per minute that is suitable for washing delicate fabrics. When the 4-pole run winding 42 is energized with reverse polarity, the rotor 44 runs in the reverse direction at its high speed of approximately 1725 r.p.m. effecting high speed spinning of the spin tub 19a at a speed of approximately 640 r.p.m. that is suitable for water-extraction from regular fabrics; and when the 6-pole run winding 43 is energized with reverse polarity, the rotor 44 runs in the reverse direction at its low speed of approximately 1140 r.p.m. effecting low speed spinning of the spin tub 19a at a speed of approximately 420 r.p.m. that is suitable for water-extraction from delicate fabrics.

Also, the rotor 44 is provided with a rotatably mounted operating shaft 45 to which there is operatively connected a speed responsive device 46 that is illustrated as being of the flyball governor type; which device 46 is provided with an operating shaft 47 carrying two contact bridging members 48 and 49. Each of the contact bridging members 48 and 49 is provided with cooperating back and front contact sets, described more fully hereinafter. Also, as illustrated in Fig. 3, the hot water solenoid 23a, the cold water solenoid 24a and the dispenser solenoid 30a are illustrated diagrammatically as rectangles.

Considering now in greater detail the connection and arrangement of the control circuit 100, as shown in Fig. 3, a source of electric power supply of 118-volts, single-phase, A.-C., is provided that includes two line conductors 171 and 172. In the arrangement, it may be assumed that the index pointer 52 occupies its rotary "off" position and it is also depressed, so as to actuate the line switch 60 into its open position. At this time: the switch spring 71 disengages the switch springs 72 and 73; the switch spring 74 disengages the switch springs 75 and 76; the switch spring 77 disengages the switch springs 78 and 79; the switch spring 81 disengages the switch springs 82 and 83; the switch spring 84 engages the switch spring 86; the switch spring 87 engages the switch spring 88; the switch spring 91 disengages the switch springs 92 and 93; and the switch spring 94 disengages the switch spring 95. Also, at this time, it may be assumed that in the pushbutton switch 110 the individual pushbutton 111 is operated, that in the pushbutton switch 120 the individual pushbutton 122 is operated, that in the pushbutton switch 130 the individual pushbutton 131 is operated, that in the pushbutton switch 140 the individual pushbutton 141 is operated, and that in the pushbutton switch 150 the individual pushbutton 151 is operated. Furthermore, the windings of the drive motor 40 are deenergized; whereby the rotor 44 at rest causes the contact bridging members 48 and 49 to bridge the associated back contacts.

Considering now in greater detail the wiring diagram, the line conductor 171 is connected to one contact of the line switch 60 and the other contact thereof is connected to a conductor 192. The switch springs 72, 71 and 73 are respectively connected to conductors 173, 174 and 175; the switch springs 75, 74 and 76 are respectively connected to conductors 176, 177 and 178; the switch springs 78, 77 and 79 are respectively connected to conductors 179, 178 and 181; the switch springs 82, 81 and 83 are respectively connected to conductors 180, 181 and 182; the switch springs 85, 84 and 86 are respectively connected to conductors 183, 172 and 184; the switch springs 88, 87 and 89 are respectively connected to conductors 183, 185 and 184; the switch springs 92, 91 and 93 are respectively connected to conductors 186, 182 and 187; and the switch springs 94 and 95 are respectively connected to the conductors 181 and 192. The terminals of the timer motor 55 are connected across the conductors 172 and 181; the terminals of the hot water solenoid 23a are connected across the conductors 172 and 174; the terminals of the cold water solenoid 24a are connected across the conductors 172 and 177; and the terminals of the dispenser solenoid 30a are connected across the conductors 172 and 180. The terminals of the 4-pole run winding 42 are connected across the conductors 183 and 184; the terminals of the 6-pole run winding 43 are connected across the conductors 172 and 191; and the terminals of the 4-pole start winding 41 are connected across the conductors 172 and 190. The two back contacts associated with the contact bridging member 49 are respectively connected to the conductors 181 and 188; the two front contacts associated with the contact bridging member 49 are respectively connected to the conductors 181 and 182; the three back contacts associated with the contact bridging member 48 are respectively connected to the conductors 189, 190 and 185; and the two front contacts associated with the contact bridging member 48 are respectively connected to the conductors 189 and 191.

The pair of contacts 114 controlled by the pushbutton 111 are connected between conductors 178 and 173; the pair of contacts 115 controlled by the pushbutton 112 are connected between conductors 178 and 173; the pair of contacts 116 controlled by the pushbutton 112 are connected between conductors 178 and 176; the pair of contacts 117 controlled by the pushbutton 113 are connected between conductors 178 and 176; the pair of contacts 123 controlled by the pushbutton 122 are connected between conductors 178 and 175; the pair of contacts 133 controlled by the pushbutton 131 are connected between conductors 188 and 178; the pair of contacts 134 controlled by the pushbutton 132 are connected between conductors 188 and 179; the pair of contacts 143 controlled by the pushbutton 141 are connected between conductors 187 and 185; the pair of contacts 144 controlled by the pushbutton 142 are connected between conductors 187 and 189; the pair of contacts 153 controlled by the pushbutton 151 are connected between conductors 186 and 185; the pair of contacts 154 controlled by the pushbutton 152 are connected between conductors 186 and 189; and the pair of contacts 163 controlled by the pushbutton 161 are connected between conductors 182 and 181.

Before proceeding with the particular controls that are carried out by the program controller 50 in the automatic cycle of operation of the control circuits 100, reference is first made to the time sequence control chart of Fig. 4, wherein there are disclosed these items of the control cams C1 to C8, inclusive, incorporated in the program controller 50, together with the time durations of the corresponding functions of the machine 10. In reading this chart, it will be understood, for example, that the control cam C1 governs both the switch springs 71—72 and the switch springs 71—73 (closing the same during the time intervals indicated by the solid or filled-in blocks and opening the same during all other time intervals). The same notation applies to the other sets of switch springs governed by the other control cams C2 to C8, inclusive.

Referring to the top of this chart, it will be observed that the first "start-fill" position of the program controller 50 is followed by a first "stop-fill" position thereof, with a time interval of five steps therebetween; after a space of three steps, a second "start-fill" position is provided, followed by a second "stop-fill" position, with a time interval of five steps therebetween; and after a space of three steps, a third "start-fill" position is provided, followed by a third "stop-fill" position, with a time interval of five steps therebetween. After an additional space of four steps, a "stop-wash" position is provided; which "stop-wash" position is followed by subsequent control positions, including a "first-spin" position, a "second-spin" position, and finally the "off" position.

Accordingly, it will be understood: that the time interval between the first "start-fill" position and the first "stop-fill" position is five steps, leaving the remaining long washing time interval preceding the final "stop wash" position; that the time interval between the second "start-fill" position and the second "stop-fill" position is five steps, leaving a remaining medium washing time interval preceding the final "stop-wash" position; and that the time interval between the third "start-fill" position and the third "stop-fill" position is five steps, leaving a remaining short washing time interval preceding the final "stop-wash" position. The three "stop-fill" positions also constitute "start wash" positions; whereby the utilization of the first "start-fill" position effects a fixed time interval of fill of the tub 19a with wash water followed by a long washing time interval for the washing of the clothes containing heavy soil; whereby the utilization of the second "start-fill" position effects a fixed time interval of fill of the tub 19a with wash water followed by a medium washing time interval for the washing of the clothes containing regular soil; and whereby the utilization of the third "start-fill" position effects a fixed time interval of fill of the tub 19a with wash water followed by a short washing time interval for the washing of the clothes containing light soil. As explained more fully hereinafter, the fixed time interval of fill of the tub 19a may be selectively established by the automatic water level control switch 130 either at a time interval of five steps or at a time interval of four steps of the program controller 50; the five-step fill corresponding to the "completely-full" pushbutton 131 of the control switch 130, and the four-step fill corresponding to the "partially-full" pushbutton 132 of the control switch 130.

Considering now in greater detail the mode of operation of the machine 10 in conjunction with the control circuit 100, and again assuming that the circuit 100 occupies the position illustrated in Fig. 3, and corresponding to the preselections that are established by the particularly operated pushbuttons of the control switches 110, 120, 130, 140 and 150, the operator places the clothes to be washed into the spin tub 19a through the top opening in the drain tub 15, with the top door 14 in its open position, and then closes the top door 14. Having estimated the soil of the clothes to be washed, the operator rotates the index pointer 52 to a corresponding and appropriate one of the three "start-fill" positions, as previously explained; and herein, it may be assumed that the operator rotates the index pointer 52 to the first "start-fill" position disposed at the very beginning of the "heavy-soil" position of the program controller 50, as indicated by the "heavy-soil" segment of the index plate 53, in Fig. 2. As previously pointed out, this preselection of the first "start-fill" position of the program controller effects a manual selection of a relatively long washing time interval for the washing of the heavily soiled clothes; whereupon the operator then actuates the index pointer 52 axially, moving the same outwardly away from the backsplash 26 into its projected position, thereby to cause the corresponding movement of the operating shaft 51 to actuate the line switch 60 into its closed position. At this time, the program controller 50 occupies its first "start-fill" position, in accordance with the previously assumed manual selection; whereby as shown in the chart of Fig. 4, the control cam C1 closes the switch springs 71—72; the control cam C2 closes the switch springs 74—75; the control cam C3 closes the switch springs 77—78; the control cam C5 closes the switch springs 84—85; the control cam C6 closes the switch springs 87—89 and the control cam C8 closes the switch springs 94—95. At this point, it is noted that the control cams C5 and C6 constitute a composite reversing switch controller, the switch spring 84 constituting one pole of the reversing switch and the switch spring 87 constituting the other pole of the reversing switch. When the switch springs 84 and 87 occupy their present positions, the individual switch springs 84—85 being closed and the individual switch springs 87—89 being closed, the drive motor 40 is poled for forward rotation of the rotor 44; and it will be recalled that forward rotation of the rotor 44 effects a washing action by the agitator 20a upon the clothes in the spin tub 19a. On the other hand, when the switch springs 84 and 87 occupy their opposite positions with respect to their present positions, the individual switch springs 84—86 being closed and the individual switch springs 87—88 being closed, the drive motor 40 is poled for reverse rotation of the rotor 44; and it will be recalled that the reverse rotation of the rotor 44 effects a spinning or wash-extracting action of the spin tub 19a with respect to the clothes contained therein.

Returning now to the operation of the control circuit 100, when the program controller 100 occupies its first "start-fill" position, as noted above, a circuit is completed for operating the timer motor 55; which circuit extends from the line conductor 172 directly to one terminal of the timer motor 55 and extends from the line conductor 171 via the closed line switch 60, the conductor 192, the closed switch springs 95—94 and the conductor 181 to the other terminal of the timer motor 55. Accordingly, the timer motor 55 operates to effect the intermittent operation of the escapement mechanism 57, as previously explained; whereby the operating shaft 51 is rotated step-by-step further in the clockwise direction, one step every 45 seconds, and ultimately back into its "off" position, thereby to bring about the automatic timed cycle of operation of the machine 10, as explained more fully below.

Also when the program controller 50 occupies its first "start-fill" position, a circuit is prepared at the closed switch springs 71—72 for energizing the hot water solenoid 23a and a circuit is prepared at the closed switch springs 74—75 for energizing the cold water solenoid 24a, which last-mentioned circuits are selectively completed under the control of the wash water temperature control switch 110. In the present example, only the circuit mentioned for energizing the hot water solenoid 23a is completed, by virtue of the fact that the individual hot pushbutton 111 of the control switch 110 occupies its operated position, as illustrated in Fig. 3; which circuit for energizing the hot water solenoid 23a extends from the line conductor 172 to one terminal of the hot water solenoid 23a and from the line conductor 171 via the closed line switch 60, the conductor 192, the closed switch springs 95—94, the conductor 181, the contact bridging member 49 and its closed back contacts, the conductor 188, the closed contacts 133, the conductor 178, the closed contacts 114, the conductor 173, the closed switch springs 72—71 and the conductor 174 to the other terminal of the hot water solenoid 23a. When the hot water solenoid 23a is thus energized, the hot water valve 23 is operated from its closed position into its open position; whereby hot water from the hot water pipe 21 is supplied via the tube 25 into the open top of the spin tub 19a.

As noted above, the program controller 50 is further rotated step-by-step in the clockwise direction by the escapement mechanism 57 and at the conclusion of five steps (3 minutes and 45 seconds), the program controller is rotated into its sixth step; whereby the control cam C1 opens the the set of switch springs 71—72, the control cam C2 opens the set of switch springs 74—75, and the control cam C4 closes the set of switch springs 81—83. Opening of the set of switch springs 71—72 interrupts the previously traced circuit for energizing the hot water solenoid 23a; whereby the hot water valve 23 is returned back into its normal closed position terminating the supply of hot water into the spin tub 19a. Closure of the set of switch springs 81—83 effects starting of the drive motor 40; and more particularly, both the 4-pole run winding 42 and the 4-pole start winding 41 are energized. The circuit for energizing the 4-pole run winding 42 extends from the line conductor 171 via the closed line switch 60, the conductor 192, the closed switch springs 95—94, the conductor 181, the closed switch springs 81—83, the conductor 182, the closed switch springs 91—93, the conductor 187, the closed contacts 143, the conductor 185, the closed switch springs 87—89, the conductor 184, the 4-pole run winding 42, the conductor 183 and the closed switch springs 85—84 to the line conductor 172. The circuit for energizing the 4-pole start winding 41 extends from the line conductor 171 via the closed line switch 60, the conductor 192, the closed switch springs 95—94, the conductor 181, the closed switch springs 81—83, the conductor 182, the closed switch springs 91—93, the conductor 187, the closed contacts 143, the conductor 185, the contact bridging member 48 closing the contacts terminating the conductors 185 and 190, the conductor 190 and the 4-pole start winding 41 to the line conductor 172.

In the above described circuits, the 4-pole start winding 41 is energized in the downward direction, as viewed in Fig. 3, between the line conductors 171 and 172, while the 4-pole run winding 42 is energized in the upper direction, as viewed in Fig. 3, between the line conductors 171 and 172, thereby effecting forward polarity of the rotating field produced in the frame of the drive motor 40, with the result that the rotor 44 is started in the forward direction. When the rotor 44 gains approximately 60% of its normal running speed, the speed-responsive device 46 is operated; whereby the contact bridging member 48 opens the associated back contacts so as to effect the deenergization of the 4-pole start winding 41; however, the circuit for energizing the 4-pole run winding 42 is not altered; whereby the rotor 44 is accelerated on into its high forward running speed. Also, upon operating the contact bridging member 49 interrupts its associated back contacts, thereby to interrupt a further point in the previously traced circuit for energizing the hot water solenoid 23a so as positively to insure that the supply of hot water to the spin tub 19a is terminated at this time. Further, the contact bridging members 48 and 49 close their respectively associated front contacts, for a purpose more fully explained hereinafter. At this time, the rotor 44 of the drive motor 40 is rotated in the forward direction, thereby to cause oscillation of the agitator 20a and the resulting washing action upon the clothes contained in the spin tub 19a. Furthermore, the rotor 44 is rotated in the forward direction at its relatively high speed as established by the operated position of the individual high pushbutton 141 of the wash speed control switch 140; whereby the high speed forward rotation of the rotor 44 causes the fast oscillation of the agitator 20a appropriate to a regular washing action upon the clothes contained in the spin tub 19a. Accordingly, at this time, there is initiated the desired preset long time interval of the washing action of the agitator 20a; and as time proceeds, the program controller 50 is driven further in the clockwise direction step-by-step by the escapement mechanism 57.

Still subsequently, at the conclusion of 18 steps of the escapement mechanism 57, the program controller is driven into its 19th position; whereby the control cam C4 closes the set of switch springs 81—82 so as to complete a circuit for energizing the solenoid 30a of the dispenser 30. The circuit mentioned extends from the line conductor 172 to one terminal of the dispenser solenoid 30a and from the line conductor 171 via the closed line switch 60, the conductor 192, the closed switch springs 95—94, the conductor 181, the closed switch springs 81—82, and the conductor 180 to the other terminal of the dispenser solenoid 30a. The program controller 50 is then driven by the escapement mechanism 57 into its 20th position; whereby the control cam C4 interrupts the switch springs 81—82 so as to deenergize the dispenser solenoid 30a. This energization and following deenergization of the dispenser solenoid 30a effects operation of the dispenser 30 to bring about the ejection of a measured quantity of the liquid clothes conditioning agent from the dispenser 30 via the tube 31 into the open top of the spin tub 19a, with the result that the liquid clothes conditioning agent mentioned is dispensed into the wash water contained in the spin tub 19a during the washing action of the agitator 20a upon the clothes contained in the spin tub 19a.

The program controller 50 is subsequently driven into its 25th position; whereby the control cam C2 closes the set of switch springs 74—76 and the control cam C3 closes the set of switch springs 77—79. Closure of the sets of switch springs 74—76 and 77—79 completes a circuit for energizing the cold water solenoid 24a. This circuit extends from the line conductor 172 to one terminal of the cold water solenoid 24a and from the line conductor 171 via the closed line switch 60, the conductor 192, the closed switch springs 95—94, the conductor 181, the closed switch springs 79—77, the conductor 178, the closed switch springs 76—74 and the conductor 177 to the other terminal of the cold water solenoid 24a. Energization of the cold water solenoid 24a operates the cold water valve 24 into its open position; whereby cold water is supplied from the cold water pipe 22 via the tube 25 into the open top of the spin tub 19a, so as to effect overflowing of the wash water therein into the drain tub 15, during oscillation of the agitator 20a, for the purpose of floating any scum from the surface of the charge of wash water contained in the spin tub 19a.

Subsequently, the program controller 50 is driven into its 26th position; whereby the control cam C2 opens the set of switch springs 74—76 and the control cam C7 opens the set of switch springs 91—93. Opening of the set of switch springs 74—76 interrupts the previously traced circuit for energizing the cold water solenoid 24a; whereby the cold water valve 24 is returned back into its closed position, in order to cut-off the supply of cold water to the spin tub 19a. Opening of the set of switch springs 91—93 interrupts the previously traced circuit for energizing the 4-pole run winding 42 of the drive motor 40; whereby rotation of the rotor 44 in the forward direction is quickly arrested.

The program controller 50 is then driven into its 27th position; whereby the control cam C4 closes the set of switch springs 81—83, the control cam C5 closes the set of switch springs 84—86, the control cam C6 closes the set of switch springs 87—88 and the control cam C7 closes the set of switch springs 91—92. Closure of the sets of switch springs 81—83, 84—86, 87—88 and 91—92 effects starting of the drive motor 40; and more particularly, both the 4-pole run winding 42 and the 4-pole start winding 41 are energized. The circuit for energizing the 4-pole run winding 42 extends from the line conductor 171 via the closed line switch 60, the conductor 192, the closed switch springs 95—94, the conductor 181, the closed switch springs 81—83, the conductor 182, the closed switch springs 91—92, the conductor 186, the closed contacts 153, the conductor 185, the closed switch springs 87—88, the conductor 183, the 4-pole run winding 42, the conductor 184 and the closed switch springs 86—84 to the line conductor 172. The circuit for energizing the 4-pole start winding 41 extends from the line conductor 171 via the closed line switch 60, the conductor 192, the closed switch springs 95—94, the conductor 181, the closed switch springs 81—83, the conductor 182, the closed switch springs 91—92, the conductor 186, the closed contacts 153, the conductor 185, the contact bridging member 48 closing the contacts terminating the conductors 185 and 190, the conductor 190 and the 4-pole start winding 41 to the line conductor 172.

In the above described circuits, the 4-pole start winding 41 and the 4-pole run winding 42 are both energized in the downward direction, as viewed in Fig. 3, between the line conductors 171—172, thereby effecting reverse polarity of the rotating field produced in the frame of the drive motor 40, with the result that the rotor 44 is started in the reverse direction. When the rotor 44 gains approximately 60% of its normal running speed, the speed responsive device 46 is operated; whereby the contact bridging member 48 opens the associated back contacts, so as to effect the deenergization of the 4-pole start winding 41; however, the circuit for energizing the 4-pole run winding 42 is not altered; whereby the rotor 44 is accelerated on into its high reverse running speed. At this time, the rotor 44 of the drive motor 40 is rotated in the reverse direction at its high speed, thereby to cause spinning of the spin tub 19a at its high speed, with the result that the wash water is flung therefrom by centrifugal force into the drain tub 15 and pumped from the drain tub 15 by the pump, not shown, incorporated in the unit 16 to drain. Specifically, the water from the drain tub 15 is conducted via the conduit 15a into the pump mentioned and discharged via the conduit 15b to drain.

The program controller 50 is subsequently driven into its 30th position; whereby the control cam C2 recloses the set of switch springs 74—76, so as to recomplete the above described circuit for energizing the cold water solenoid 24a, with the result that the cold water valve 24 is again operated into its open position, so as again to supply cold water from the cold water pipe 22 via the tube 25 into the spinning spin tub 19a, thereby to subject the clothes therein to a spinning rinsing action, following the prior discharge of the wash water from the spin tub 19a.

Then the program controller 50 is driven into its 31st position; whereby the control cam C2 returns the set of switch springs 74—76 into its open position, with the result that the cold water solenoid 24a is deenergized to effect the return of the cold water valve 24 back into its closed position, thereby to terminate the supply of cold water from the cold water pipe 22 into the spinning spin tub 19a, for the purpose of terminating the spinning rinsing action mentioned above.

Still subsequently, the program controller 50 is driven into its 33rd position, whereby the control cam C4 opens the set of switch springs 81—83, and the control cam C7 opens the set of switch springs 91—92. Opening of the set of switch springs 91—92 interrupts the previously traced circuit for energizing the 4-pole run winding 42 of the drive motor 40; whereby rotation of the rotor 44 in the reverse direction is quickly arrested.

Subsequently, the program controller 50 is driven into its 34th position; whereby the control cam C1 closes the set of switch springs 71—73, the control cam C2 closes the set of switch springs 74—76 and the control cam C4 closes the set of switch springs 81—82. Closure of the switch springs 71—73 completes a circuit for energizing the hot water solenoid 23a. The circuit extends from the line conductor 172 to one terminal of the hot water solenoid 23a and from the line conductor 171 via the closed line switch 60, the conductor 192, the closed switch springs 95—94, the conductor 181, the closed switch springs 79—77, the conductor 178, the closed contacts 123, the conductor 175, the closed switch springs 73—71 and the conductor 174 to the other terminal of the hot water solenoid 23a. Energization of the hot water solenoid 23a operates the hot water valve 23 into its open position. Closure of the switch springs 74—76 completes the previously traced circuit for energizing the cold water solenoid 24a, whereby the cold water valve 24 is operated into its open position. Opening of both the hot water valve 23 and the cold water valve 24 brings about the mixing of the hot water and the cold water in the tube 25, whereby warm water is supplied into the open top of the spin tub 19a. Further closure of the switch springs 81—82 completes the previously traced circuit for energizing the dispenser solenoid 30a.

Subsequently, the program controller 50 is driven into its 38th position; whereby the control cam C5 opens the switch springs 84—86 and closes the switch springs 84—85 and the control cam C6 opens the switch springs 87—88 and closes the switch springs 87—89; with the result that the circuit is again prepared to energize the 4-pole run winding 42 with forward polarity so as to prepare the unit 16 for operation of the agitator 20a.

Then the program controller 50 is driven into its 39th position; whereby the control cam C1 opens the set of switch springs 71—73, the control cam C2 opens the set of switch springs 74—76, the control cam C4 opens the set of switch springs 81—82, and the control cam C7 closes the set of switch springs 91—93. Opening of the set of switch springs 71—73 interrupts the previously traced circuit for energizing the hot water solenoid 23a, and opening of the set of switch springs 74—76 interrupts the previously traced circuit for energizing the cold water solenoid 24a; whereby both the hot water valve 23 and the cold water valve 24 are closed to cut off the supply of warm water to the spin tub 19a. Opening of the set of switch springs 81—82 interrupts the previously traced circuit for energizing the dispenser solenoid 30a; whereby a measured charge of the liquid clothes conditioning agent is delivered from the dispenser 30 via the tube 31 into the open top of the spin tub 19a and thus into the charge of rinse water contained therein. Closure of the set of switch springs 91—93 completes the previously traced circuit for energizing the 4-pole run winding 42 with forward polarity, as well as the previously traced circuit for energizing the 4-pole start winding 41; whereby the rotor 44 is again run in the forward direction at its high speed in order to effect fast oscillation of the agitator 20a. The speed-responsive device 46 actuates the contact bridging member 48 to deenergize the 4-pole start winding 41, after starting of the rotor 44 in the manner previously explained.

Subsequently, the program controller 50 is driven into its 41st position; whereby the control cams C1 and C2 respectively close the sets of switch springs 71—73 and 74—76, with the result that the hot water solenoid 23a and the cold water solenoid 24a are energized; whereby the hot water valve 23 and the cold water valve 24 are both opened to effect the supply of warm water into the spin tub 19a, while the agitator 20a is oscillated at high speed. Thus a deep agitated rinsing action is effected upon the clothes in the spin tub 19a, accompanied by overflowing of the rinse water from the spin tub 19a into the drain tub 15.

Subsequently, the program controller 50 is driven into its 43rd position; whereby the control cams C1 and C2 respectively open the sets of switch springs 71—73 and 74—76 so as to deenergize the respective hot water solenoid 23a and cold water solenoid 24a, with the result that the supply of warm water to the spin tub 19a is cut off, so as to terminate the overflow rinsing action upon the clothes in the spin tub 19a. Also, the control cam C7 opens the set of switch springs 91—93, so as to interrupt the circuit for energizing the 4-pole run winding 42, with the result that rotation of the rotor 44 in the forward direction is quickly arrested.

Then the program controller 50 is driven into its 44th position; whereby the control cam C3 opens the set of switch springs 77—79 to interrupt a further point in the circuits for energizing the water solenoids 23a and 24a. Also the control cams C5 and C6 respectively open the sets of switch springs 84—85 and 87—89 and respectively close the sets of switch springs 84—86 and 87—88, with the result that the circuit is again prepared to energize the 4-pole run winding 42 with reverse polarity so as to prepare the unit 16 for operation of the spin tub 19a. Further, the control cam C7 closes the set of switch springs 91—92; whereby the 4-pole run winding 42 is energized with reverse polarity and the 4-pole start winding 41 is energized, with the result that the rotor 44 is rotated at high speed in the reverse direction effecting high speed spinning of the spin tub 19a so as to subject the clothes therein to a corresponding water-extracting action. After starting of the rotor 44, the speed-responsive device 46 effects deenergization of the 4-pole start winding 41 in the manner previously explained.

Still subsequently, the program controller 50 is driven into its 55th position; whereby the control cam C4 opens the set of switch springs 81—83 and the control cam C7 opens the set of switch springs 91—92. Opening of the set of switch springs 91—92 interrupts the circuit for energizing the 4-pole run winding 42, with the result that the reverse rotation of the rotor 44 is quickly arrested.

Finally, the program controller 50 is driven into its 56th position; whereby the control cam C8 opens the set of switch springs 94—95, thereby to interrupt the circuit for operating the timer motor 55, so as to arrest further operation of the program controller 50 in its "off" position. In passing, it is noted that the "off" position of the program controller extends from its 56th position to its 60th position, and that subsequently when the program controller 50 is manually rotated toward its "first-fill" position (its 1st position) it is necessarily operated through its 59th position (included in its "off" position); whereby the control cams C5 and C6 respectively open the switch springs 84—86 and 87—88 and respectively close the switch springs 84—85 and 87—89, thereby again to set the circuits for forward rotation of the rotor 44 of the drive motor 40. At this time, when the program controller is in its 56th position (a part of its "off" position) the operator ordinarily depresses the manual knob 52 returning it toward the front of the backsplash 26, so as to operate the line switch 60 back into its open position. This movement of the operating shaft 51 of the program controller 50 again places the segment 61 below the cooperating stop 62, as shown in Figs. 2 and 3, so as again to establish the desired relationship therebetween in order to insure the subsequent operation of the program controller 50 into the very beginning of one of its "start-fill" positions for the purpose previously explained.

Reconsidering the operation of the program controller 50 with reference to its three "start-fill" positions, in the foregoing example, it was assumed that the first "start-fill" (the "heavy soil" position) thereof was employed in the automatic cycle. In this case, the spin tub 19a was filled with wash water in the 1st to the 5th positions of the program controller 50 (3 minutes and 45 seconds) and then in the 6th position, forward rotation of the rotor 44 was initiated to start the washing action; whereby the time duration of the "heavy soil" setting of the program controller 50 occupies the 6th to 25th positions thereof or 15 minutes. When the second "start-fill" (the "regular soil" position) of the program controller 50 is employed in the automatic cycle, the spin tub 19a is filled with wash water in the 9th to 13th positions of the program controller 50 (3 minutes and 45 seconds) and then in the 14th position, forward rotation of the rotor 44 is initiated; whereby the time duration of the "regular soil" setting of the program controller 50 occupies the 14th to 25th positions thereof or 9 minutes. When the third "start-fill" (the "light soil" position) of the program controller 50 is employed in the automatic cycle, the spin tub 19a is filled with wash water in the 17th to 21st positions of the program controller 50 (3 minutes and 45 seconds) and then in the 22nd position, forward rotation of the rotor 44 is initiated; whereby the time duration of the "light soil" setting of the program controller 50 occupies the 22nd to 25th positions thereof, or 3 minutes.

Again reconsidering the operation of the program controller 50 with reference to the filling of the spin tub 19a with wash water, the previously explained time interval of 3 minutes and 45 seconds (5 steps of the program controller 50) resulted from the operated position of the "completely-full" pushbutton 131 of the automatic water level control switch 130. However, this time interval that is allocated to the filling of the spin tub 19a with wash water may be reduced from 3 minutes and 45 seconds (5 steps of the program controller 50) to 3 minutes (4 steps of the program controller) by operation of the "partially-full" pushbutton 132 of the automatic water level control switch 130. More particularly, operation of the "partially-full" pushbutton 132 of the control switch 130 inserts the set of switch springs 77—78 into the water circuits between the conductors 188 and 178 (the circuit extending from the conductor 188 via the closed contacts 134, the conductor 179 and the closed switch springs 78—77 to the conductor 178); whereby the switch springs 77—78 are included in series relation with the switch springs 71—72 and/or the switch springs 74—75, so that the water control circuit is opened by the set of switch springs 77—78 after 3 minutes of use (4 steps of the program controller 50), instead of by the set of switch springs 71—72 and/or the set of switch springs 74—75 after 3 minutes and 45 seconds (5 steps of the program controller 50).

Continuing with the consideration of the filling of the spin tub 19a with wash water, it is noted that after the program controller 50 has been set into any one of its "start-fill" positions noted, and regardless of the operated position of the automatic water level control switch 130, the water level may be controlled manually by the operator by momentarily operating the manual water level control switch 160. More particularly, operation of the manual pushbutton 161 of the switch 160 closes the contacts 163, thereby connecting together the conductors 181 and 182 and by-passing the pair of motor start switch springs 81—83; whereby operation of the drive motor 40 is immediately initiated, and notwithstanding the fact that the program controller 50 has not reached one of its "start-wash" positions (the 6th, 14th or 22nd positions thereof). More specifically, operation of the rotor 44 in the forward direction is initiated, with the result that the washing action is also prematurely initiated. Further, the speed-responsive device 46 opens the contact bridging member 49 and its associated back contacts, with the result that the water circuit via the conductors 181 and 188 is interrupted, so that the water valves 23 and 24 are closed to cut off the supply of water to the spin tub 19a.

Further considering the initial filling of the spin tub 19a with wash water, in the foregoing example, the operated "hot" pushbutton 111 of the wash water temperature control switch 110 prepared the previously traced circuit for energizing the hot water solenoid 23a under the control of the set of switch springs 71—72. In a similar manner, operation of the "cold" pushbutton 113 of this switch 110 prepares a similar circuit for energizing the cold water solenoid 24a under the control of the set of switch springs 74—75. Finally, operation of the "warm" pushbutton 112 prepared both of the circuits mentioned for respectively energizing the hot water solenoid 23a and the cold water solenoid 24a; whereby the warm water is produced as a result of the mixing of the hot water and the cold water, in the manner previously explained.

Considering now the temperature of the rinse water that is introduced into the spin tub 19a, when the program controller 50 reaches its 34th position, the set of switch springs 74—76 is closed by the control cam C2 and the set of switch springs 71—73 is closed by the control cam C1, as previously explained. Closure of the set of switch springs 74—76 completes the previously traced direct circuit for energizing the cold water solenoid 24a, while closure of the set of switch springs 71—73 completes the previously traced circuit for energizing the hot water solenoid 23a, including the closed contacts 123 of the operated "warm" pushbutton 122 of the rinse water temperature control switch 120. Thus, in the event the "cold" pushbutton 121 of the switch 120 is operated, only cold rinse water is supplied to the spin tub 19a; whereas, operation of the "warm" pushbutton 122 of the switch 120 effects the supply of both hot and cold water (warm rinse water) to the spin tub 19a.

Turning now to the washing action of the machine 10, in the foregoing example, it was assumed that the "high" pushbutton 141 of the wash speed control switch 140 occupied its operated position, with the result that the drive motor 40 was started in the forward direction by the conjoint energization of the 4-pole windings 41 and 42 with forward polarity, followed by energization of the 4-pole run winding 42 with forward polarity, so as to effect high speed forward running of the rotor 44. In the event the "low" pushbutton 142 of the wash speed control switch 140 occupies its operated position, the circuits are altered incident to operation of the speed-responsive device 46; and more particularly, after forward starting of the rotor 44 by the conjoint energization of the 4-pole windings 41 and 42, these circuits are interrupted, at the contact bridging member 48 and its associated back contacts, in response to operation of the speed-responsive device 46 at approximately 60% of the high speed of the rotor 44. Also at this time, the contact bridging members 48 and 49 complete, at their front contacts, a circuit for energizing the 6-pole run winding 43; whereby forward running of the rotor 44 continues, but at its low speed. The circuit for energizing the 6-pole run winding 43 extends, when completed, from the line conductor 171 via the closed line switch 60, the conductor 192, the closed switch springs 95—94, the conductor 181, the contact bridging member 49 and its closed front contacts, the conductor 182, the closed switch springs 91—93, the conductor 187, the closed contacts 144, the conductor 189, the contact bridging member 48 and its closed front contacts, the conductor 191 and the 6-pole run winding 43 to the line conductor 172.

Turning now to the water-extracting action of the machine 10, in the foregoing example, it was assumed that the "high" pushbutton 151 of the spin speed control switch 150 occupied its operated position, with the result that the drive motor 40 was started in the reverse direction by the conjoint energization of the 4-pole windings 41 and 42 with reverse polarity, followed by energization of the 4-pole run winding 42 with reverse polarity, so as to effect high speed reverse running of the rotor 44. In the event the "low" pushbutton 152 of the spin speed control switch 150 occupies its operated position, the circuits are altered incident to operation of the speed-responsive device 46; and more particularly, after reverse starting of the rotor 44 by the conjoint energization of the 4-pole windings 41 and 42, these circuits are interrupted, at the contact bridging member 48 and its associated back contacts, in response to operation of the speed-responsive device 46 at approximately 60% of the high speed of the rotor 44. Also, at this time, the contact bridging members 48 and 49 complete, at their front contacts, a circuit for energizing the 6-pole run winding 43; whereby reverse running of the rotor 44 continues, but at its low speed. The circuit for energizing the 6-pole run winding 43 extends, when completed, from the line conductor 171 via the closed line switch 60, the conductor 192, the closed switch springs 95—94, the conductor 181, the contact bridging member 49 and its closed front contacts, the conductor 182, the closed switch springs 91—92, the conductor 186, the contacts 154, the conductor 189, the contact bridging member 48 and its closed front contacts, the conductor 191 and the 6-pole run winding 43 to the line conductor 172.

In view of the foregoing, it is apparent that there has been provided in a clothes washing machine of the automatic type, an electric drive motor of the 2-speed reversible-rotor type, and an improved control circuit for the motor, whereby forward rotation of the rotor at its respective high and low speeds effect respective normal and gentle washing actions in the automatic cycle of the machine, and reverse rotation of the rotor at its respective high and low speeds effect respective normal and gentle water-extracting actions in the automatic cycle of the machine. Also, the control circuit embodies improved manually operable facility for presetting any one of a number of different washing time intervals, following a fixed filling time interval of the tub, and preceding a predetermined subsequent sequence of finishing steps upon the clothes.

While there has been described what is at present considered to be the preferred embodiment of the invention, it will be understood what various modifications may be made therein, and it is intended to cover in the appended claims all such modifications as fall within the true spirit and scope of the invention.

What is claimed is:

1. In a clothes washing machine adapted to proceed through a predetermined cycle of operations for washing the clothes and for extracting water from the clothes, a rotatably mounted clothes-receiving basket, a clothes agitator disposed within said basket, an electric drive motor of the two-speed reversible-rotor type, mechanism responsive to forward rotation of said rotor at its respective low and high speeds for operating said agitator at respective slow and fast speeds so as to effect two corresponding washing actions upon the clothes in said basket and responsive to reverse rotation of said rotor at its respective low and high speeds for rotating said basket at respective slow and fast speeds so as to effect two corresponding water-extracting actions upon the clothes in said basket, a first manually operable switch for preselecting either of the forward speeds of said rotor, thereby to preselect the corresponding washing action, a second manually operable switch for preselecting either of the reverse speeds of said rotor, thereby a preselect the corresponding water-extracting action, a reversing switch having washing and water-extracting positions, and cycle controlling means for selectively operating said reversing switch between its washing and water-extracting positions in a predetermined cycle, said reversing switch in its washing position establishing a polarity of said motor to effect forward rotation of said rotor at the particular forward speed preselected by said first manually operable switch and said reversing switch in its water-extracting position establishing a polarity of said motor to effect reverse rotation of said rotor at the particular reverse speed preselected by said second manually operable switch.

2. The clothes washing machine combination set forth in claim 1, wherein each of said manually operable switches is of the pushbutton type including two individual pushbuttons respectively corresponding to the two speeds of said rotor.

3. In a clothes washing machine adapted to proceed through a predetermined cycle of operations for washing the clothes and for extracting water from the clothes, a rotatably mounted clothes-receiving basket, a clothes agitator disposed within said basket, an electric drive motor of the two-speed split-phase induction type including a reversible rotor and provided with a start winding and a low speed run winding and a high speed run winding, mechanisms responsive to forward rotation of said rotor at its respective low and high speeds for operating said agitator at respective slow and fast speeds so as to effect two corresponding washing actions upon the clothes in said basket and responsive to reverse rotation of said rotor at its respective low and high speeds for rotating said basket at respective slow and fast speeds so as to effect two corresponding water-extracting actions upon the clothes in said basket, a device governed by the speed of said rotor and having corresponding start and run positions, a control switch governed by said device and having corresponding start and run positions, a manually operable washing selector switch for preselecting either of said run windings, a manually operable water-extracting selector switch for preselecting either of said run windings, a reversing switch having washing and water-extracting positions, a cyclically operative program controller for selectively operating said reversing switch between its washing and water-extracting positions, and a circuit network governed jointly by said control switch and by said washing selector switch and by said water-extracting selector switch and by said reversing switch for selectively controlling energization of said windings, said start winding and said high speed run winding being energized with forward polarity with said control switch in its start position and with said reversing switch in its washing position, the one of said run windings preselected by said washing selector switch being energized with said control switch in its run position and with said reversing switch in its washing position, said start winding and said high speed run winding being energized with reverse polarity with said control switch in its start position and with said reversing switch in its water-extracting position, the one of said run windings preselected by said water-extracting selector switch being energized with said control switch in its run position and with said reversing switch in its water-extracting position, whereby said program controler establishes said predetermined cycle and said washing selector switch preselects the washing action in said cycle and said water-extracting selector switch preselects the water-extracting action in said cycle.

4. The clothes washing machine combination set forth in claim 3, wherein said start winding is an N-pole winding and said high speed run winding is an N-pole winding and said low speed run winding is an M-pole winding, where N ad M are even numbers and M>N.

5. The clothes washing machine combination set forth in claim 4, where $N=4$ and $M=6$.

6. In a clothes washing machine, a tub adapted to receive the clothes to be washed, mechanism operative to wash the clothes in said tub, a water supply system communicating with said tub and including a valve, a program controller having an off position and a start-fill position and a first stop-fill position and a second stop-fill position and a start-wash position and a stop-wash position, manually operable means for operating said program controller from its off position into its start-fill position, timing means responsive to operation of said program controller into its start-fill position for operating said program controller successively as time proceeds from its start-fill position into its first stop-fill position and then into its second stop-fill position and then into its start-wash position and then into its stop-wash position, a manually operable control switch having a partially-full position and a completely-full position, control means responsive to operation of said program controller into its start-fill position for operating said valve into its open position, said control means being governed by said control switch in its partially-full position and responsive to operation of said program controller into its first stop-fill position for operating said valve into its closed position, said control means being governed by said control switch in its completely-full position and responsive to operation of said program controller into its second stop-fill position for operating said valve into its closed position, whereby the volume of water supplied into said tub is preselected by said control switch, and means responsive to operation of said program controller into its start-wash position for initiating operation of said mechanism and responsive to operation of said program controller into its stop-wash position for arresting operation of said mechanism.

7. The clothes washing machine combination set forth in claim 6, and further comprising a manually operable member for operating said valve into its closed position independently of the position of said control switch and with said program controller in any position thereof between its start-fill position and its second stop-fill position, whereby the volume of water supplied into said tub may be manually selected by the operator.

8. In a clothes washing machine, a tub adapted to receive the clothes to be washed, mechanism operative to wash the clothes in said tub, an electric drive motor for operating said mechanism, a water supply system communicating with said tub and including a valve, a program controller having an off position and a start-fill position and a first stop-fill position and a second stop-fill position and a start-wash position and a stop-wash position, manually operable means for operating said program controller from its off position into its start-fill position, timing means responsive to operation of said program controller into its start-fill position for operating said program controller successively as time proceeds from its start-fill position into its first stop-fill position and then into its second stop-fill position and then into its start-wash position and then into its stop-wash position, a manually operable control switch having a partially-full position and a completely-full position, control means responsive to operation of said program controller into its start-fill position for operating said valve into its open position, said control means being governed by said control switch in its partially-full position and responsive to operation of said program controller into its first stop-fill position for operating said valve into its closed position, said control means being governed by said control switch in its completely-full position and responsive to operation of said program controller into its second stop-fill position for operating said valve into its closed position, whereby the volume of water supplied into said tub is preselected by said control switch, means responsive to operation of said program controller into its start-wash position for initiating operation of said drive motor and responsive to operation of said program controller into its stop-wash position for arresting operation of said drive motor, and means controlled by operation of said drive motor for positively insuring operation of said valve into its closed position.

9. The clothes washing machine combination set forth in claim 8, and further comprising a manually operable start switch for initiating operation of said drive motor with said program controller in any position thereof between its start-fill position and its start-wash position, whereby the volume of water supplied into said tub may be manually selected by the operator.

10. In a clothes washing machine, a tub adapted to receive the clothes to be washed, mechanism operative to wash the clothes in said tub, a water supply system including valve mechanism communicating with said tub and both a hot water pipe and a cold water pipe connected to said valve mechanism, manually operable means for preselecting the temperature of the water to be supplied from said valve mechanism into said tub, a program controller having an off position and start-fill position and a first stop-fill position and a second stop-fill position and a start-wash position and a stop-wash position, manually operable means for operating said program controller from its off position into its start-fill position, timing means responsive to operation of said program controller into its start-fill position for operating said program controller successively as time proceeds from its start-fill position into its first stop-fill position and then into its second stop-fill position and then into its start-wash position and then into its stop-wash position, a manually operable switch having a partially-full position and a completely-full position, control means responsive to operation of said program controller into its start-fill position for operating said valve mechanism into its open position, said control means being governed by said control switch in its partially-full position and responsive to operation of said program controller into its first stop-fill position for operating said valve mechanism into its closed position, said control means being governed by said control switch in its completely-full position and responsive to operation of said program controller into its second stop-fill position for operating said valve mechanism into its closed position, whereby the volume of water supplied into said tub is preselected by said control switch, and means responsive to operation of said program controller into its start-wash position for initiating operation of said mechanism and responsive to operation of said program controller into its stop-wash position for arresting operation of said mechanism.

11. In a clothes washing machine, a tub adapted to receive the clothes to be washed, mechanism operative to wash the clothes in said tub, a water supply system communicating with said tub and including a normally closed valve, a program controller having an off position and a first start-fill position and a first start-wash position and a second start-fill position and a second start-wash position and a stop-wash position, manually operable means for advancing said program controller directly from its off position into either one of its start-fill positions, timing means operative to advance said program controller at a timed rate from an occupied one of its start-fill positions through its intervening positions into its stop-wash position, means controlled by the advancing of said program controller into one of its start-fill positions for initiating operation of said timing means, whereby said program controller when advanced by said manually operable means into its first start-fill position is further advanced by said timing means into its first start-wash position and then into its second start-fill position and then into its second start-wash position and thence into its stop-wash position, with the result that a relatively long time interval is required to advance said program controller from its first start-fill position into its stop-wash position, and whereby said program controller when advanced by said manually operable means into its second start-fill position is further advanced by said timing means into its second start-wash position and thence into its stop-wash position, with the result that a relatively short time interval is required to advance said program controller from its second start-fill position into its stop-wash position, means controlled during the time interval that said program controller is advanced from the occupied one of its start-fill positions into the adjacent one of its start-wash positions for operating said valve into its open position, means controlled by the advancing of said program controller into the first-encountered one of its start-wash positions for operating said valve back into its closed position and for initiating operation of said mechanism, and means controlled by the advancing of said program controller into its stop-wash position for arresting operation of said mechanism.

12. The clothes washing machine combination set forth in claim 11, wherein a given time interval is required to advance said program controller from either one of its start-fill positions into the adjacent one of its start-wash positions, so that the volume of the water supplied to said tub is substantially fixed and independent of the one of said start-fill positions to which said program controller is initially advanced by said manually operable means.

13. In a clothes washing machine, a tub adapted to receive the clothes to be washed, mechanism operative to wash the clothes in said tub, a water supply system communicating with said tub and including a valve, a program controller having an off position and a first start-fill position and a first start-wash position and a second start-fill position and a second start-wash position and a stop-wash position, a start switch, manually operable means for advancing said program controller directly from its off position into either one of its start-fill positions and then for closing said start switch, timing means operative to advance said program controller at a timed rate from an occupied one of its start-fill positions through its intervening positions into its stop-wash position, means responsive to closure of said start switch for initiating operation of said timing means, whereby said program controller when advanced by said manually operable means into its first start-fill position is further advanced by said timing means into its first start-wash position and then into its second start-fill position and then into its second start-wash position and thence into its stop-wash position, with the result that a relatively long time interval is required to advance said program controller from its first start-fill position into its stop-wash position, and whereby said program controller when advanced by said manually operable means into its second start-fill position is further advanced by said timing means into its second start-wash position and thence into its stop-wash position, with the result that a relatively short time interval is required to advance said program controller from its second start-fill position into its stop-wash position, first circuit means controlled by said start switch in its closed position and responsive to the advancing of said program controller into the first-encountered one of its start-fill positions for operating said valve into its open position and responsive to the advancing of said program controller into the first-encountered one of its start-wash positions for operating said valve into its closed position, second circuit means controlled by said start switch in its closed position and responsive to the advancing of said program controller into the first-encountered one of its start-wash positions for initiating operation of said mechanism, means controlled by operation of said mechanism for disabling said first circuit means, and third circuit means controlled by the advancing of said program controller into its stop-wash position for arresting operation of said mechanism.

14. The clothes washing machine combination set forth in claim 13, and further comprising means for preventing closing of said start switch by said manually operable means when said program controller has been advanced by said manually operable means to any position disposed intermediate said first start-fill position and said second start-fill position.

15. In a clothes washing machine, a tub adapted to receive the clothes to be washed, mechanism operative to wash the clothes in said tub, a water supply system communicating with said tub and including a valve, a program controller having an off position and a first start-fill position and a first start-wash position and a second start-fill position and a second start-wash position and a stop-wash position, a start switch, a manually operable member mounted for both rotary and axial movements, rotary movement of said member advancing said program controller directly from its off position into either one of its start-fill positions and axial movement of said member closing said start switch, means accommodating said axial movement of said manually operable member when said program controller has been advanced by said rotary movement of said manually operable member into either one of its start-fill positions and preventing said axial movement of said manually operable member when said program has been advanced by said rotary movement of said manually operable member into any position disposed intermediate its first start-fill position and its second start-fill position, timing means operative to advance said program controller at a timed rate from an occupied one of its start-fill positions through its intervening positions into its stop-wash position, means responsive to closure of said start switch for initiating operation of said timing means, whereby said program controller when advanced by said manually operable means into its first start-fill position is further advanced by said timing means into its first start-wash position and then into its second start-fill position and then into its second start-wash position and thence into its stop-wash position, with the result that a relatively long time interval is required to advance said program controller from its first start-fill position into its stop-wash position, and whereby said program controller when advanced by said manually operable means into its second start-fill position is further advanced by said timing means into its second start-wash position and thence into its stop-wash position, with the result that a relatively short time interval is required to advance said program controller from its second start-fill position into its stop-wash position, first circuit means controlled by said start switch in its closed position and responsive to the advancing of said program controller into the first-encountered one of its start-fill positions for operating said valve into its open position and responsive to the advancing of said program controller into the first-encountered one of its start-wash positions for operating said valve into its closed position, second circuit means controlled by said start switch in its closed position and responsive to the advancing of said program controller into the first-encountered one of its start-wash positions for initiating operation of said mechanism, means controlled by operation of said mechanism for disabling said first circuit means, and third circuit means controlled by the advancing of said program controller into its stop-wash position for arresting operation of said mechanism.

16. In a clothes washing machine, a tub adapted to receive the clothes to be washed, mechanism operative to wash the clothes in said tub, a water supply system communicating with said tub and including a normally closed valve, a program controller having an off position and a first start-fill position and a first start-wash position and a second start-fill position and a second start-wash position and a stop-wash position arranged in the sequence named, manually operable means for advancing said program controller directly from its off position into either one of its start-fill positions, timing means for advancing said program controller from its occupied first start-fill position into its first start-wash position in a first fixed time interval and therefrom into its second start-fill position in a second fixed time interval and from its occupied second start-fill position into its second start-wash position in a third fixed time interval and therefrom into its stop-wash position in a fourth fixed time interval, means for retaining open said valve during said first time interval in the event said program controller is advanced directly into its first start-fill position and for retaining open said valve during said third time interval in the event said program controller is advanced directly into its second start-fill position, said first time interval and said third time interval being of the same given time duration, whereby water is supplied from said water supply system to said tub during said given time interval regardless of the one of its start-fill positions to which said program controller is directly advanced, and means for operating said mechanism throughout said second time interval and said third time interval and said fourth time interval in the event said program controller is advanced directly into its first start-fill position and for operating said mechanism only throughout said fourth time interval in the event said program controller is advanced directly into its second start-fill position, whereby the total time interval during which said mechanism is operated is dependent upon the one of its start-fill positions to which said program controller is directly advanced from its off position.

References Cited in the file of this patent

UNITED STATES PATENTS

| | | |
|---|---|---|
| 2,841,003 | Conlee | July 1, 1958 |
| 2,894,384 | Smith | July 14, 1959 |

FOREIGN PATENTS

| | | |
|---|---|---|
| 214,863 | Australia | May 1, 1958 |

UNITED STATES PATENT OFFICE

CERTIFICATION OF CORRECTION

Patent No. 2,957,329            October 25, 1960

Vito Re

It is hereby certified that error appears in the above numbered patent requiring correction and that the said Letters Patent should read as corrected below.

Column 19, line 66, for "a" read -- to --; column 20, line 17, for "mechanisms" read -- mechanism --; line 62, for "ad" read -- and --.

Signed and sealed this 2nd day of May 1961.

(SEAL)
Attest:

ERNEST W. SWIDER
Attesting Officer

DAVID L. LADD
Commissioner of Patents